Patented Apr. 2, 1935

1,996,715

UNITED STATES PATENT OFFICE 1,996,715

CELLULOSE LACQUER COMPOSITION

Charles Bogin, Terre Haute, Ind., assignor to Commercial Solvents Corporation, Terre Haute, Ind., a corporation of Maryland No Drawing. Application April 13, 1931, Serial No. 529,799

2 Claims. (Cl. 134—79)

The present invention relates to a method for preventing the yellowing of pigmented cellulose lacquer films.

Cellulose lacquer films containing white pigments in the past have been found to be poorly suited for some purposes due to the tendency shown by such films to turn yellow when exposed to either diffused or direct sunlight. The degree and speed of this coloration of pigmented nitrocellulose lacquer films has been found to depend to a large degree upon certain definite factors. For example, it has been found that films containing gums, resins, pigments, etc. but no nitrocellulose, are generally not subject to yellowing. Likewise, films containing nitrocellulose, pigments, etc. but no gums or resins, are generally not subject to yellowing. On the other hand, films containing both nitrocellulose and gums or resins, as well as pigments and other materials are subject to yellowing in varying degrees dependent upon the particular pigment or pigments and gums or resins employed.

Of the various gums or resins commonly used in the production of lacquers, ester gum appears to cause the most difficulty in regards yellowing due both to the degree of yellowing and the extent of its use, altho white pigmented lacquers containing a mixture of ester gum and a phenol-formaldehyde resin, yellow more extensively even than similar films containing only ester gum. Films containing such gums as kauri, elemi, mastic, congo, etc. also turn yellow but not to the same degree as similar films containing the much more extensively used ester gum.

All white pigmented nitrocellulose lacquer films containing gums or resins such as those just mentioned appear to be subject to the disadvantage of yellowing under certain conditions. This is particularly the case when such films are exposed to direct or diffused sunlight, under ordinary conditions of exposure, with the single exception of films of this character which contain zinc oxide as the white pigment. For some unexplained reason such films appear not to be subject to the degree of yellowing to which other white pigments such as titanium dioxide, mixtures of titanium oxide and barium sulphate, mixtures of zinc sulphide and barium sulphate antimony oxide, zinc sulfide, white lead, etc. are subject under similar circumstances. However, at somewhat elevated temperatures, such as are ordinarily attained in wall surfaces located close to radiators, even films containing zinc oxide as the pigment are subject to very decided yellowing. The same thing is true even at ordinary temperatures in the case of films containing some other white pigment in addition to zinc oxide.

Altho it has been noted that the yellowing of lacquer films generally takes place only when nitrocellulose, gums or resins and a white pigment (other than zinc oxide, except at temperatures above room temperature) are present together, it is not definitely known what agency is responsible for this particular effect. Various theories as to the cause of this phenomenon have been advanced, the most probable of which appears to indicate that the yellowing of the film is brought about as the result of reactions which take place between acids from the resins or gums and the nitrocellulose and/or pigment.

It has now been discovered that the yellowing of white pigmented nitrocellulose lacquers containing gums or resins may be effectively reduced and in most cases entirely suppressed by the incorporation in the lacquer of a small amount of an alkali such as, for example, calcium, barium, strontium, magnesium, sodium, potassium oxide or hydroxide. The amount of agent required depends naturally upon the particular pigment or pigments and resins or gums used in the lacquer, and to some extent, upon the particular alkali used in preventing yellowing of the pigmented film. Since mixtures of ester gum and phenol-formaldehyde resins and even ester gum per se generally bring about a greater degree of yellowing than when dammar is used, it is generally necessary to use larger proportions of alkali in compositions containing these gums than is the case with similar compositions containing dammar. Similarly since at ordinary temperatures little or no yellowing takes place in films containing zinc oxide as the pigment, the amount of alkali which is incorporated in such compositions may be greatly reduced, unless of course, the lacquer is to be used where the film will be subjected to high temperatures, which as has previously been noted, causes distinct yellowing even in the case of zinc oxide.

When appreciable amounts of zinc oxide are used together with other pigments more susceptible to yellowing, the tendency for the film thereby obtained to yellow is appreciably lessened but even in this case the addition of an alkali has a marked effect in reducing the degree of yellowing further.

The method of preventing the yellowing of pigmented lacquer films herein disclosed is of the greatest commercial importance in nitrocellulose lacquer films containing ester gum and titanium dioxide, due to the cheapness and general use of the former and the high covering power and general desirability of the latter. The use of small amounts of alkali very effectively reduces the tendency of such films to turn yellow.

The amount of alkali which it is desirable or necessary to employ, as indicated above, depends upon a number of factors. Amounts varying from 0.05% to 1.0% by weight, based upon the lacquer solution, have been employed with success in numerous cases. In films obtained from a lacquer containing 10% nitrocellulose 8% ester gum and 17% titanium dioxide the incorporation of the following gave satisfactory results in reducing the tendency for the film to turn yellow after a short time: 0.1% and 0.2% lime, 0.2% and 1.0% magnesium oxide, 0.4% barium hydroxide and 0.1% sodium hydroxide. In a similar lacquer containing dammar in place of ester gum, 0.05% lime was found to be sufficient to prevent yellowing of the resulting film. The yellowing of zinc oxide-ester gum-nitrocellulose lacquers at 60° C. is lessened by the incorporation in the lacquer of 0.1% lime.

The incorporation of small amounts of alkalies in white pigmented nitrocellulose lacquers which tend to yellow, or the treatment of the gums or resins to be used in such lacquers with alkalies, in general, materially lessens any tendency possessed by the films produced by such lacquers to turn yellow. In the case of films containing antimony oxide, however, this procedure apparently is not very efficacious, a distinct yellowing taking place even when appreciable amounts of alkalies are used. It is thus seen that while the present invention is applicable to white pigments of the metals of the second and fourth groups of the periodic table, it has little beneficial effect when applied to antimony oxide, the only commercially important white pigment of a metal falling outside these groups of the table. While generally applicable to all other white pigmented nitrocellulose lacquers, the method has been found to be particularly suited when used in lacquers containing titanium dioxide or zinc sulfide.

The required amount of alkali may be incorporated into the lacquer in any convenient manner, in certain cases it may be more convenient to add it directly to the finished lacquer solution. In the case of lacquers containing ester gum, the lime or other alkali can be conveniently incorporated into the ester gum solution to be used in the lacquer. This, however, is not always easily done where dammar is to be used, since grinding the dammar solutions with lime sometimes produces certain lime soaps which are insoluble in toluol and cause poor compatability in the compositions prepared therefrom. While this is not the case with all grades of dammar, it occurs with many of them and complicates the process to some extent.

A very distinct advantage of the method for reducing the tendency for lacquers to yellow which has been set forth hereinabove is the fact that the treatment specified apparently has little, if any, harmful effect on either the final lacquer film or upon the lacquer solution which retains its improved properties, once it has been treated. In order to reduce as far as possible any tendency towards reducing the durability of the final film it is of course preferred to use the minimum amount of alkali which will give the desired results. This is readily accomplished in the cases where the gum solution may be treated with the alkali. In such cases, the excess of alkali, and any precipitate that may be formed after agitation of the alkali in the gum solution may be removed before adding the gum solution to the remainder of the constituents of the lacquer. Where it is found necessary to increase the amount of alkali, it is generally advisable to increase somewhat the amount of plasticizer used in the lacquer.

The term "white pigment" has been used in the present specification and claims in the generally accepted sense of a substantially insoluble, finely divided, and relatively opaque white substance which is compatible with the other ingredients of the lacquer.

What is claimed is:

1. In a lacquer comprising nitrocellulose, a resin selected from the group consisting of natural resins and ester gum, and a white pigment of a metal of the second and fourth groups of the periodic table, which lacquer is normally subject to yellowing when exposed in a film to sunlight, the improvement comprising incorporating in such a lacquer a material selected from the group consisting of alkali and alkaline earth oxides and hydroxides, in sufficient quantity to counteract the tendency of said lacquer to yellow.

2. In a lacquer comprising nitrocellulose, a resin selected from the group consisting of natural resins and ester gum, and a white pigment of a metal of the second and fourth groups of the periodic table, which lacquer is normally subject to yellowing when exposed in a film to sunlight, the improvement comprising incorporating in such a lacquer from 0.05% to 1.0% by weight of a material selected from the group consisting of alkali and alkaline earth oxides and hydroxides, to counteract the tendency of said lacquer to yellow.

CHARLES BOGIN.